US012595775B2

(12) United States Patent
Bernardo

(10) Patent No.: US 12,595,775 B2
(45) Date of Patent: Apr. 7, 2026

(54) UNIDIRECTIONAL FUEL NOZZLE FOR IMPROVING FUEL ATOMIZATION IN A CARBURETOR OR SIMILAR APPARATUS

(71) Applicant: Rommel Bernardo, Marikina (PH)

(72) Inventor: Rommel Bernardo, Marikina (PH)

( * ) Notice: Subject to any disclaimer, the term of this patent is extended or adjusted under 35 U.S.C. 154(b) by 318 days.

(21) Appl. No.: 18/563,442

(22) PCT Filed: Dec. 10, 2021

(86) PCT No.: PCT/PH2021/050043
§ 371 (c)(1),
(2) Date: Nov. 22, 2023

(87) PCT Pub. No.: WO2022/250549
PCT Pub. Date: Dec. 1, 2022

(65) Prior Publication Data

US 2025/0223936 A1 Jul. 10, 2025

(30) Foreign Application Priority Data

May 25, 2021 (PH) .............................. 12021050239

(51) Int. Cl.
*F02M 7/00* (2006.01)
*F02M 7/02* (2006.01)
(Continued)

(52) U.S. Cl.
CPC ................ *F02M 7/23* (2019.02); *F02M 7/02* (2013.01); *F02M 19/03* (2013.01)

(58) Field of Classification Search
CPC ............. F02M 7/23; F02M 7/02; F02M 19/03
(Continued)

(56) References Cited

U.S. PATENT DOCUMENTS 2,826,400 A 3/1958 Sterner et al.
3,326,538 A 6/1967 Merritt
(Continued)

FOREIGN PATENT DOCUMENTS

CN 1777748 A 5/2006
CN 116557174 A 8/2023
(Continued)

OTHER PUBLICATIONS

Tamer M. M. Abdellatief, Mikhail A. Ershov, Vsevolod D. Savelenko, Vladimir M. Kapustin, Ulyana A. Makhova, Nikita A. Klimov, Elena A. Chernysheva, Tarek M. Aboul-Fotouh, Mohammad Ali Abdelkareem, Ahmad Mustafa, and A. G. Olabi, "Advanced Progress and Prospects for Producing High-Octane Gasoline Fuel toward Market Development: State-of-the-Art and Outlook", Energy Fuels, Nov. 16, 2023, 37, 23, 18266-18290, https://doi.org/10.1021/acs.energyfuels.3c02541 ; https://pubs.acs.org/doi/abs/10.1021/acs.energyfuels.3c02541.
(Continued)

*Primary Examiner* — T. Bennett McKenzie
(74) *Attorney, Agent, or Firm* — Rivka Friedman

(57) ABSTRACT

The present invention generally relates to a method and device that enhances fuel atomization in a carburetor or a similar apparatus. Specifically, it introduces a unidirectional fuel nozzle that is designed to improve the atomization of fuel injected into the fuel-air mixing chamber of a combustion engine. The fuel nozzle comprises a cylindrical body with a plurality of perforations on one half and a plurality of dimples on the outer surface of the other half. Each dimple is designed with an air turbulator, which creates turbulence on the surface of the fuel nozzle in response to the air pressure, delaying the separation of the air from the surface of the fuel nozzle. As a result, fuel droplets break down further, improving fuel atomization. This enhances the com-
(Continued)

bustion efficiency of the engine by allowing the fuel to mix with air more effectively.

12 Claims, 2 Drawing Sheets

(51) Int. Cl.
*F02M 7/23* (2006.01)
*F02M 19/03* (2006.01)

(58) Field of Classification Search
USPC ........................................................ 261/121.3
See application file for complete search history.

(56) References Cited

U.S. PATENT DOCUMENTS

| | | | |
|---|---|---|---|
| 3,664,648 A | 5/1972 | Seeley, Jr. | |
| 4,217,313 A | 8/1980 | Dmitrievsky | |
| 4,241,877 A | 12/1980 | Hughes | |
| 4,515,734 A | 5/1985 | Rock et al. | |
| 5,223,180 A | 6/1993 | Yost | |
| 7,472,894 B2 | 1/2009 | Shedd et al. | |
| 8,167,277 B2 | 5/2012 | Satterfield | |
| 9,624,888 B2 | 4/2017 | Acker et al. | |
| 2003/0160341 A1* | 8/2003 | Satterfield | C10L 1/00 261/62 |
| 2004/0040201 A1 | 3/2004 | Roos et al. | |
| 2006/0225697 A1 | 10/2006 | Huckelberry et al. | |
| 2009/0255258 A1 | 10/2009 | Bretz et al. | |
| 2009/0277157 A1 | 11/2009 | Martin et al. | |
| 2012/0091601 A1 | 4/2012 | James | |
| 2018/0306146 A1 | 10/2018 | Thompson | |

FOREIGN PATENT DOCUMENTS

| | | | | |
|---|---|---|---|---|
| JP | S5987259 A | 5/1984 | | |
| KR | 20150022023 A | 3/2015 | | |
| KR | 20170109173 A | 9/2017 | | |
| WO | WO-9737120 A1 * | 10/1997 | | F02M 19/03 |

OTHER PUBLICATIONS

Mujtahid bin Mohd Abidin, "An Investigation on the Effects of an Intake Air-Swirl Device on Fuel Consumption of a Spark Ignition Engine", University Teknologi Petronas, Jan. 2008, http://utpedia.utp.edu.my/id/eprint/3809 https://utpedia.utp.edu.my/id/eprint/3809/.

Moh'd Abu-Qudais, K.R Asfar, Ramzi Al-Azzam, "Engine performance using vaporizing carburetor", Energy Conversion and Mnagament, vol. 42, Issue 6, Apr. 2001, pp. 755-761, https://doi.org/10.1016/S0196-8904(00)00098-4 https://www.sciencedirect.com/science/article/abs/pii/S0196890400000984.

Swapnil Bhurat, Krishna kant Dixit, Prashant Shukla, Himanshu Sharma, Amrit Kumar Jha, Ram Kunwer, "Magnetization of Diesel fuel for Compression Ignition Engine to Enhance Efficiency and Emissions", International Journal of Applied Engineering Research, Jan. 2018, https://www.researchgate.net/publication/341832468.

Ftwi Yohaness Hagos, A. Rashid A. Aziz, Shaharin Anwar Sulaiman, "Trends of Syngas as a Fuel in Internal Combustion Engines", Advance in Mechanical Engineering, Jan. 1, 2014, https://doi.org/10.1155/2014/401587 https://journals.sagepub.com/doi/full/10.1155/2014/401587.

* cited by examiner

UNIDIRECTIONAL FUEL NOZZLE FOR IMPROVING FUEL ATOMIZATION IN A CARBURETOR OR SIMILAR APPARATUS

TECHNICAL FIELD OF THE INVENTION

The present invention generally relates to a system and method for improving fuel atomization in a carburetor or a similar apparatus. More particularly, the present invention relates to a unidirectional fuel nozzle designed to improve the atomization of fuel injected into the fuel-air mixing chamber of a combustion engine.

BACKGROUND OF THE INVENTION

Conventional main fuel nozzles found in carburetors for small to medium displacement engines have only one outlet where liquid gasoline ejects and enters the fuel-air mixing chamber. The carburetor of a motorcycle or earlier model automobile does not directly control the liquid fuel flow, but the carburetor controls the air flow that goes into the engine. The speed and pressure of the flow will determine how much fuel is mixed with the airstream. Low air velocity results in a lack of pressure drop especially at the surrounding regions of the main fuel nozzle and jet needle (for motorcycles) that makes fuel delivery inefficient and insufficient. Furthermore, the low velocity fuel-ejection fails to atomize the fuel sufficiently, exaggerating the effect of an inadequate fuel volume.

As found in the prior art, there exist systems for improving emulsification of fuel with air for a more efficient fuel combustion. WO1997037120A1 discloses a fuel nozzle having an upstream orifice and multiple downstream orifices, wherein the surface area of the upstream orifice is smaller than that of the downstream orifice to limit fuel being drawn only through the downstream orifices. The '120 patent further describes the orifices having a configuration that changes in area from the surface inward to, perhaps, improve its performance in terms of the nozzle's propensity to discharge fuel. US20030160341A1 provides a method for improving fuel emulsion by passing the air-fuel mixture over threaded or other knurled surfaces, or over bumps, protrusions, cavities, or dimples, before introducing the mixture into the venturi portion of the carburetor. These dimples, and the like, can be located in any passage or emulsified fuel/air delivery system that contains both air and fuel being delivered to a combustion chamber. For instance, the obstructions and so forth could be in the main delivery tube or main nozzle.

Although both '120 patent and '341 patent application generally disclose dimples or orifices changing in area from the surface inward for improving fuel emulsion or the nozzle's propensity to discharge fuel, the prior art does not specifically disclose a fuel nozzle designed with a combination of dimples disposed on one half circumferentially and through-hole perforations—with outer hemispherical cavities—on the other half of the nozzle's body. This design significantly improves atomization and penetration of fuel droplets towards the combustion chamber. Hence, it can bring forth significant savings on fuel consumption, for example, to motorcycle riders and also benefits to the environment because of a lesser amount of carbon emissions.

BRIEF SUMMARY OF THE INVENTION

It is the object of the present invention to provide a method for improving fuel atomization and penetration in a combustion engine. It is a further object of the present invention to provide a fuel nozzle designed to improve the atomization of fuel injected into the fuel-air mixing chamber of a combustion engine. The fuel nozzle is comprised of a plurality of perforations through one half of the nozzle's cylindrical body and a plurality of dimples disposed on the outer surface of the other half. Each of the perforations extends throughout the inner surface and the outer surface of the cylindrical body and terminates with an air turbulator, being defined by a hemispherical cavity at the outer surface. On the other hand, each of the dimples is also designed with an air turbulator, which is defined as a hemispherical cavity only at the outer surface and does not protrude through the inner surface. These air turbulators generate air vortices on the nozzle's outer surface as air enters a carburetor's air-fuel mixing chamber and flows through each of the turbulators. This consequently facilitates the further breaking of fuel droplets ejected through the perforations in the direction towards the combustion chamber, and thereby improving the atomization of fuel in a combustion engine.

The design of having perforations on one half of the fuel nozzle leads to an even higher fuel combustion efficiency as fuel is ejected through the perforations in a unidirectional-downstream direction-high-velocity manner towards the combustion engine.

BRIEF DESCRIPTION OF THE DRAWINGS

The accompanying drawings, which are included to provide a further understanding of the invention, are incorporated herein to illustrate embodiments of the invention. Along with the description, they also serve to explain the principle of the invention. In the drawings.

DETAILED DESCRIPTION OF THE VARIOUS EMBODIMENTS OF THE INVENTION

Atomization is the process of breaking the fuel oil particles to extremely small droplets. Thus, atomization makes it easier to burn fuel in the combustion space. The more the droplets are broken, the better is the atomization. The quality of the atomized particles of fuel further helps the quality of combustion by contributing to the penetration process. Penetration is the distance travelled by the fuel particle inside the combustion chamber just before burning. The smaller the fuel particles in the atomization process, the lighter it is to be carried further by the air pressure to be burned properly away from the fuel nozzle. To improve the process, various embodiments of the present invention are presented.

Figure 1A:
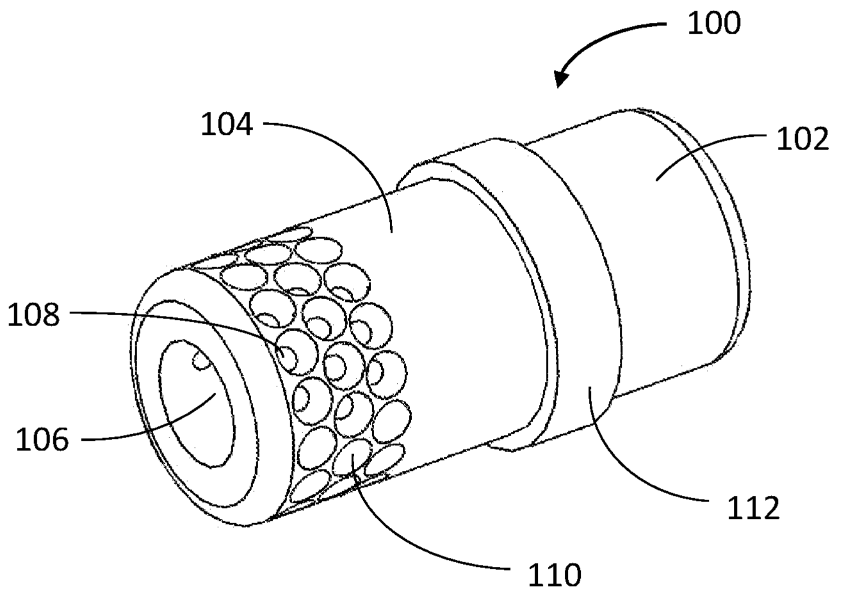
FIGS. 1A and 1B present the isometric views of the fuel nozzle according to the preferred embodiment of the present invention.
Figure 1B:
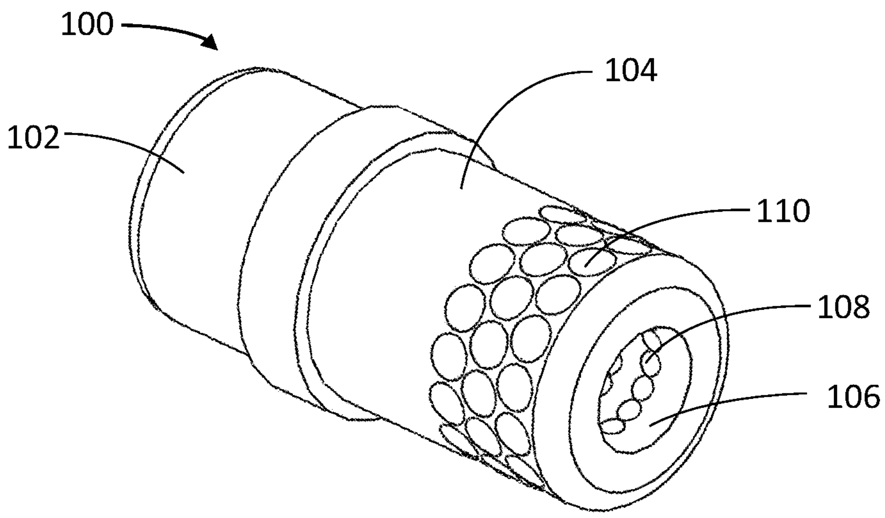

In a preferred embodiment of the present invention, FIG. 1A shows the fuel nozzle 100 for improving fuel atomization in a carburetor or a similar apparatus. The fuel nozzle 100, preferably, has a cylindrical body 102 with an outer surface 104 and an inner surface 106. The cylindrical body 102 is preferably made of gasoline and heat-resistant material. A plurality of perforations 108 is disposed through one half of the cylindrical body 102, while a plurality of dimples 110 is disposed on the outer surface 104 of the other half of the cylindrical body 102. The fuel nozzle 100 is further provided with a ferrule 112 disposed around on one end portion of the cylindrical body 102. The ferrule 112 serves as a means for installing or mounting the fuel nozzle 100, preferably detachable, in a carburetor or a similar apparatus. In one embodiment of the present invention, the fuel nozzle can be affixed in a carburetor. FIG. 1B shows a rotated, isometric view of the fuel nozzle 100 showing the plurality of dimples 110 disposed on the other half of the cylindrical body 102 and the plurality of perforations 108 protruding from the outer surface 104 through the inner surface 106.

Figure 1C:
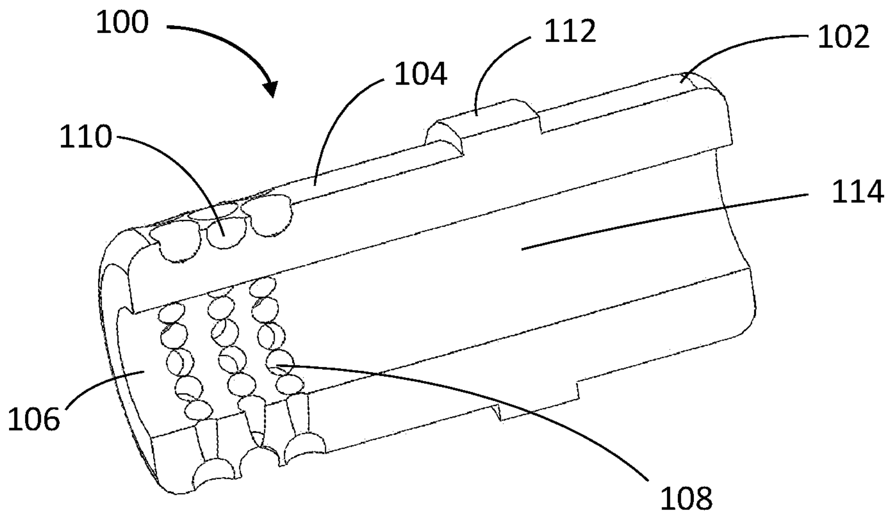
FIGS. 1C, 1D, and 1E present the section views of the fuel nozzle according to the preferred embodiment of the present invention.
Figure 1D:
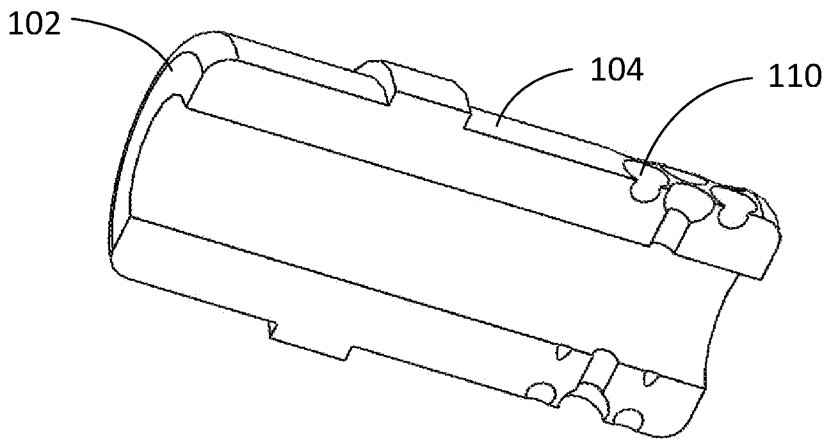

FIGS. 1C and 1D show the section views of the fuel nozzle 100 according to the preferred embodiment of the present invention. The fuel nozzle 100 further comprises a fuel tunnel 114 defined by an opening cutting through the length of and centrally located inside the cylindrical body 102. A plurality of perforations 108 and dimples 110 are disposed around the cylindrical body's one end portion opposite of the ferrule 112. As shown in FIG. 1C, each of the perforations 108 cuts through the outer surface 104 and inner surface 106 of the fuel nozzle 100. On the other hand, FIG. 1D shows each of the dimples 110 having a hemispherical cavity at the outer surface 104 of the other half of the cylindrical body 102.

Figure 1E:
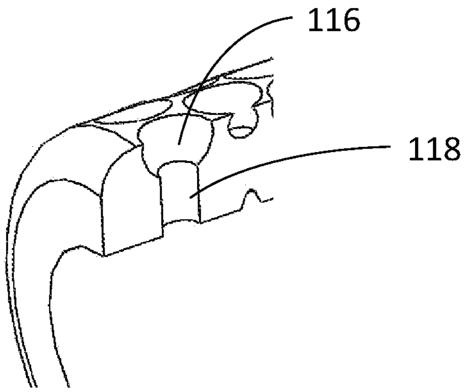

Referring to FIG. 1E, each of the perforations terminates at the outer surface with an air turbulator 116 being defined by a hemispherical cavity communicating to the fuel tunnel via a through-hole 118, preferably cylindrical in shape.

In the preferred embodiment of the present invention, the perforations and dimples are configured to be arranged in circular rows around the circumference of the cylindrical body. More preferably, the circular rows are further configured in a staggered arrangement to ensure neighboring perforations and dimples are closest to each other when arranged in multiple rows.

In some embodiments of the present invention, the diameter or the surface area of the hemispherical cavities of the dimples and perforations may differ from each other. For example, the surface area of the hemispherical cavities from the perforations may be larger than that of the dimples.

During the combustion process, as air gas enters the air-fuel mixing chamber, the air that passes through the carburetor's venturi sucks fuel through the nozzle. Unlike a regular nozzle that usually has only one outlet where gasoline ejects to enter the air-fuel mixing chamber, the fuel nozzle of the present invention is provided with a plurality of dimples and a plurality of perforations, each of which is configured with an air turbulator. As air passes the surface of the nozzle's body, the air turbulators, in the form of hemispherical cavities, create a hump for air to attach to the surface causing turbulence that creates air vortices and delays the detachment of air within the turbulator. The turbulence reduces aerodynamic drag as fuel is being ejected through the perforations before each turbulator. This causes a more atomized fuel that joins air in the mixing chamber providing better combustion.

The air turbulators defined by the hemispherical cavities on the fuel nozzle act as vortex generators, which create a thin turbulent boundary layer of air that clings to the fuel nozzle's surface. This allows the smoothly flowing air to follow the nozzle's outer surface a little farther around the back side of the nozzle (air hugging), where the multiple perforations that discharge liquid fuel are located. This "air hugging" results in a reduced wake region size, which helps optimize fuel atomization.

What is claimed is:

1. A method for improving fuel atomization in a carburetor by a fuel nozzle, the fuel nozzle comprising a cylindrical body having an outer surface and a fuel tunnel disposed centrally inside the cylindrical body, wherein the fuel tunnel being defined by a central opening that cuts through the length of the cylindrical body forming an inner surface therein; a plurality of perforations disposed on one half of the cylindrical body, wherein each of the perforations communicates the inner surface and the outer surface of the cylindrical body and terminates with an air turbulator, being defined by a hemispherical cavity at the outer surface of the cylindrical body; and a plurality of dimples disposed on the outer surface of the other half of the cylindrical body, wherein each of the dimples is defined by a hemispherical cavity at the outer surface of the cylindrical body; the method comprising the acts of:

allowing air to enter the carburetor;

generating air vortices on the outer surface of the fuel nozzle as the allowed air flows through each of the air turbulator of the plurality of perforations and through the plurality of dimples; and ejecting fuel droplets through the plurality of perforations to the carburetor's air-fuel mixing chamber, wherein the ejected fuel droplets are atomized by the generated air vortices.

2. The method according to claim 1, wherein both the plurality of perforations and dimples are arranged in circular rows around the circumference of the cylindrical body.

3. The method according to claim 2, wherein the circular rows are further configured in staggered arrangement.

4. The method according to claim 1, wherein each of the perforations faces the downstream side of the fuel nozzle.

5. The method according to claim 4, wherein each of the dimples faces the upstream side of the fuel nozzle.

6. The method according to claim 1, further comprising a ferrule disposed around on one end portion of the cylindrical body.

7. A fuel nozzle for improving fuel atomization in a carburetor comprising:

a cylindrical body having an outer surface and a fuel tunnel disposed centrally inside the cylindrical body, wherein the fuel tunnel being defined by a central opening that cuts through the length of the cylindrical body forming an inner surface therein;

a plurality of perforations disposed on one half of the cylindrical body, wherein each of the perforations communicates the inner surface and the outer surface of the cylindrical body and terminates with an air turbulator, being defined by a hemispherical cavity at the outer surface of the cylindrical body; and a plurality of dimples disposed on the outer surface of the other half of the cylindrical body, wherein each of the dimples is defined by a hemispherical cavity at the outer surface of the cylindrical body.

8. The fuel nozzle according to claim 7, wherein both the plurality of perforations and dimples are arranged in circular rows around the circumference of the cylindrical body.

9. The fuel nozzle according to claim 8, wherein the circular rows are further configured in staggered arrangement.

10. The fuel nozzle according to claim 7, wherein each of the perforations faces the downstream side of the fuel nozzle.

11. The fuel nozzle according to claim 10, wherein each of the dimples faces the upstream side of the fuel nozzle.

12. The fuel nozzle according to claim 7, further comprising a ferrule disposed around on one end portion of the cylindrical body.

* * * * *